(12) United States Patent
Wang (10) Patent No.: US 11,548,108 B1
(45) Date of Patent: Jan. 10, 2023

(54) ZEROPLAY MITER BAR

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 17/575,026

(22) Filed: Jan. 13, 2022

(51) Int. Cl.
*B23Q 3/00* (2006.01)
*B27B 25/10* (2006.01)

(52) U.S. Cl.
CPC .............. *B23Q 3/005* (2013.01); *B27B 25/10* (2013.01)

(58) Field of Classification Search
CPC ......... B27B 25/10; B27B 25/00; B27B 25/06; B27B 25/08; B27B 31/00; B27B 27/06; B23Q 3/005; B23Q 3/02; B23Q 3/18; B23Q 7/06; B23D 47/04; B27G 5/00–04; B27G 19/00; B27G 19/02
USPC ..................... 83/435.11–435.27; 254/21, 25; 269/109–113, 291
See application file for complete search history.

(56) References Cited

U.S. PATENT DOCUMENTS

| | | | |
|---|---|---|---|
| 228,410 A | 6/1880 | Squintani | |
| 503,726 A | 8/1893 | Pryibil | |
| 1,272,659 A | 7/1918 | Groomes | |
| 2,164,615 A | 7/1939 | Mafera | |
| 2,524,961 A | 10/1950 | Cramer, Jr. | |
| 2,710,633 A | 6/1955 | Oberg | |
| 2,759,503 A | 8/1956 | Goldschmidt | |
| 3,171,632 A | 3/1965 | Jines | |
| 3,735,206 A | 5/1973 | Pesek | |
| 4,354,770 A | 10/1982 | Block | |
| 4,971,570 A | 11/1990 | Tolle et al. | |
| 5,038,486 A | 8/1991 | Ducate, Sr. | |
| 5,097,601 A | 3/1992 | Pollak et al. | |
| 5,207,007 A | 5/1993 | Cucinotta et al. | |
| 5,220,485 A | 6/1993 | Chakrabarti | |
| 5,275,074 A | 1/1994 | Taylor et al. | |
| 5,379,669 A | 1/1995 | Roedig | |
| 5,382,175 A | 1/1995 | Kunkel | |
| 5,402,581 A | 4/1995 | Hurd et al. | |
| 5,472,353 A | 12/1995 | Hristake et al. | |
| 5,617,909 A | 4/1997 | Duginske | |
| 5,735,054 A | 4/1998 | Cole | |
| 5,941,514 A | 8/1999 | Burcaw | |
| 6,182,371 B1 * | 2/2001 | Newman | B23Q 9/0042 144/144.1 |
| 6,195,905 B1 | 3/2001 | Cole | |

(Continued)

*Primary Examiner* — Shelley M Self
*Assistant Examiner* — Jared O Brown
(74) *Attorney, Agent, or Firm* — Wolter Van Dyke Davis, PLLC; Robert L. Wolter (57) ABSTRACT

A miter bar assembly (100), including: a top member (102) having: a top member opening (110) configured to permit a bottom member fastener (122) to pass through the top member; and a top member fastener feature (140) configured to immovably fix the top member directly to a panel; and a bottom member (104) positioned under the top member and having: a bottom member fastener feature (120) configured cooperate with the bottom member fastener and the top member opening to enable the bottom member to move laterally relative to the top member and to selectively immovably fix the bottom member to the top member. At least one of: a magnetic force urges the bottom member and the top member laterally apart; and relative longitudinal movement between the bottom member and the top member adjusts a lateral position of the bottom member relative to the top member.

17 Claims, 11 Drawing Sheets

(56) References Cited

U.S. PATENT DOCUMENTS

| | | | |
|---|---|---|---|
| 6,237,457 B1 | 5/2001 | Taylor | |
| 6,502,492 B1 * | 1/2003 | Krohmer | B27B 25/10 |
| | | | 83/435.14 |
| 6,532,679 B2 | 3/2003 | Cole | |
| 6,672,190 B2 | 1/2004 | Taylor | |
| 6,691,423 B2 | 2/2004 | Fontaine | |
| 6,776,076 B2 | 8/2004 | Salazar | |
| 7,245,199 B1 | 7/2007 | Reilly | |
| 7,505,251 B2 | 3/2009 | Canfield et al. | |
| 7,997,313 B2 * | 8/2011 | Wang | B27B 25/10 |
| | | | 144/287 |
| 8,096,219 B2 | 1/2012 | Potter | |
| 8,661,954 B1 * | 3/2014 | Quayle | B27B 27/10 |
| | | | 83/435.14 |
| 2008/0148582 A1 * | 6/2008 | Watanabe | B43L 13/02 |
| | | | 33/454 |
| 2018/0036905 A1 | 2/2018 | Frolov | |

\* cited by examiner

ZEROPLAY MITER BAR

FIELD OF THE INVENTION

This invention relates generally to the field of woodworking and more particularly to a miter bar assembly for use within a slot on a woodworking table.

BACKGROUND OF THE INVENTION

High quality woodworking with safe operation requires the ability to maintain very close tolerances. Woodworking power tools such as table saws are known to include a straight groove or slot, known as a miter slot for slidably receiving a miter bar. Miter slot shapes include, but are not limited to, T-shapes and a U-shapes, referring in both instances to a cross-sectional shape of the miter slot. The miter bar moves within the miter slot to guide a work piece through a cutting tool, such as a saw blade, in a precise linear direction parallel to a desired cut line. Any gap between the width of the miter bar and the width of the slot allows for some undesirable horizontal and angular movement of the miter bar and the guided work piece as it is moved through the cutting tool.

The width of a miter slot has a nominal dimension, for example 750 mils on many table saws, but that dimension may vary by as much as 2-10 mils for any given table due to manufacturing tolerances. Such variation can create an unacceptable amount of positional uncertainty during woodworking operations. There is an ongoing effort in the woodworking industry to develop miter bars that can accommodate such variations in the slot width in order to minimize any gap between the width of the miter bar and the width of the slot.

BRIEF DESCRIPTION OF THE DRAWINGS

The invention is explained in the following description in view of the drawings that show.

DETAILED DESCRIPTION OF THE INVENTION

In response to the continued need in the woodworking industry for maintaining tight tolerances, and in particular for ensuring a snug, uniform fit of a miter bar within a woodworking table miter slot, the present inventor developed an innovative miter bar that provides a high degree of functionality in a rugged, shop-worthy device. The present inventor has since developed innovative improvements and changes to the miter bar as disclosed herein.

FIG. 1 to FIG. 5 show a prior art miter bar assembly as disclosed in U.S. Pat. No. 7,997,313 to Henry Wang, which is incorporated herein in its entirety.

The miter bar assembly 10 includes a top member 12 disposed on a bottom member 14 when assembled. Each of the top member 12 and bottom member 14 has an elongated, generally rectangular, flat shape such that when joined together form a miter bar assembly 10 that will fit within a miter slot of a woodworking table. As can best be appreciated in FIG. 1, each of the members 12, 14 includes at least one and preferably a plurality of cooperating pairs of wedge shapes 24. Each pair includes a male wedge member 26 and a mating female wedge member 28. Upon assembly of the miter bar assembly 10, the female wedge member 28 receives the corresponding male wedge member 26. The female wedge members 28 are preferably formed as a void volume in the respective member 12, 14. The female wedge members 28 are preferably formed as a void volume in the respective member 12, 14. Respective wedge shaped contacting side surfaces 30, 32 of the male wedge member 26 and the female wedge member 28 are each disposed to be not parallel to a longitudinal axis L of the miter bar assembly 10 so that relative longitudinal movement between the top and bottom members 12, 14 causes a respective change in width W of the miter bar assembly 10.

Figure 1:
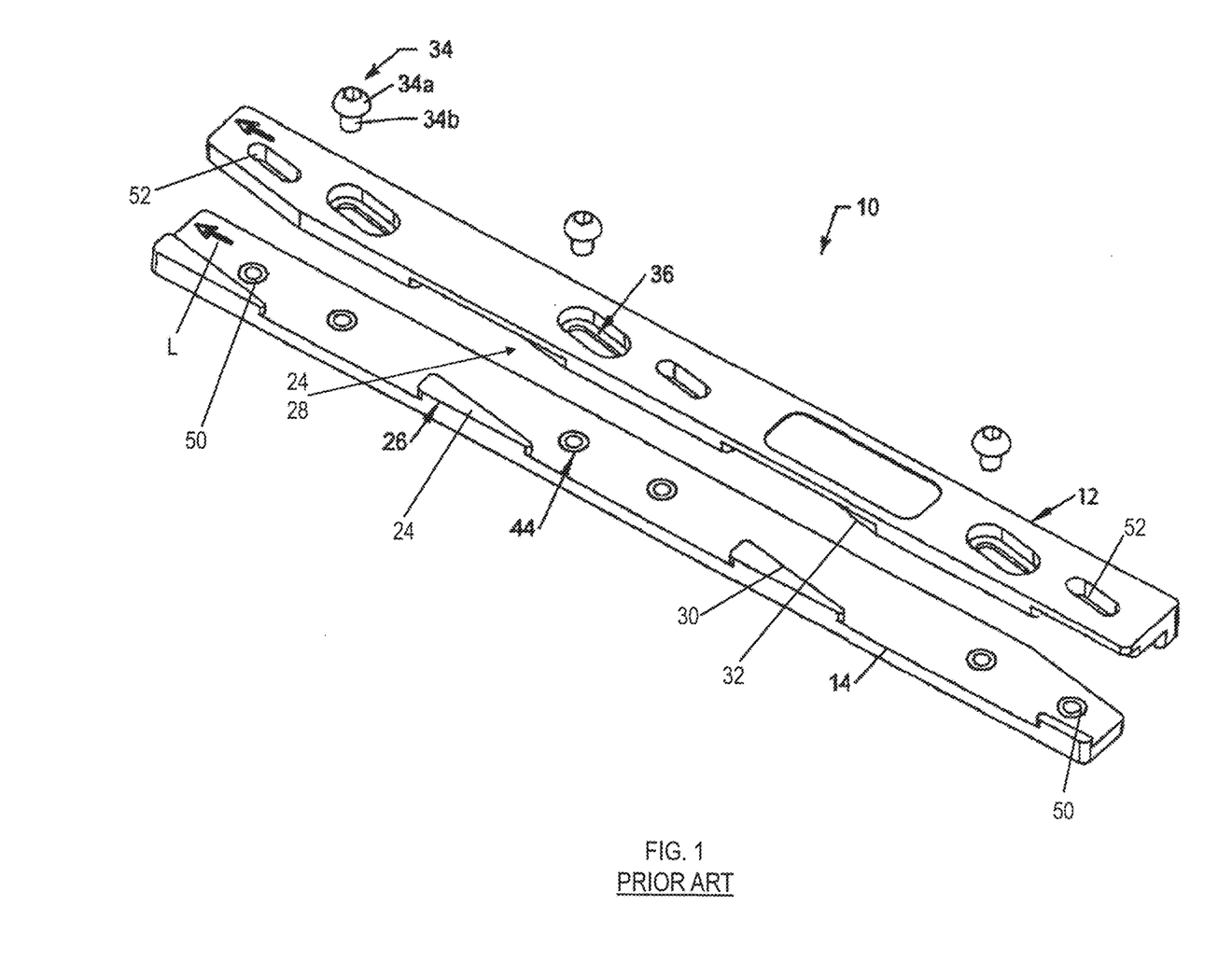
FIG. 1 shows a prior art miter bar assembly in a disassembled state.
Figure 2:
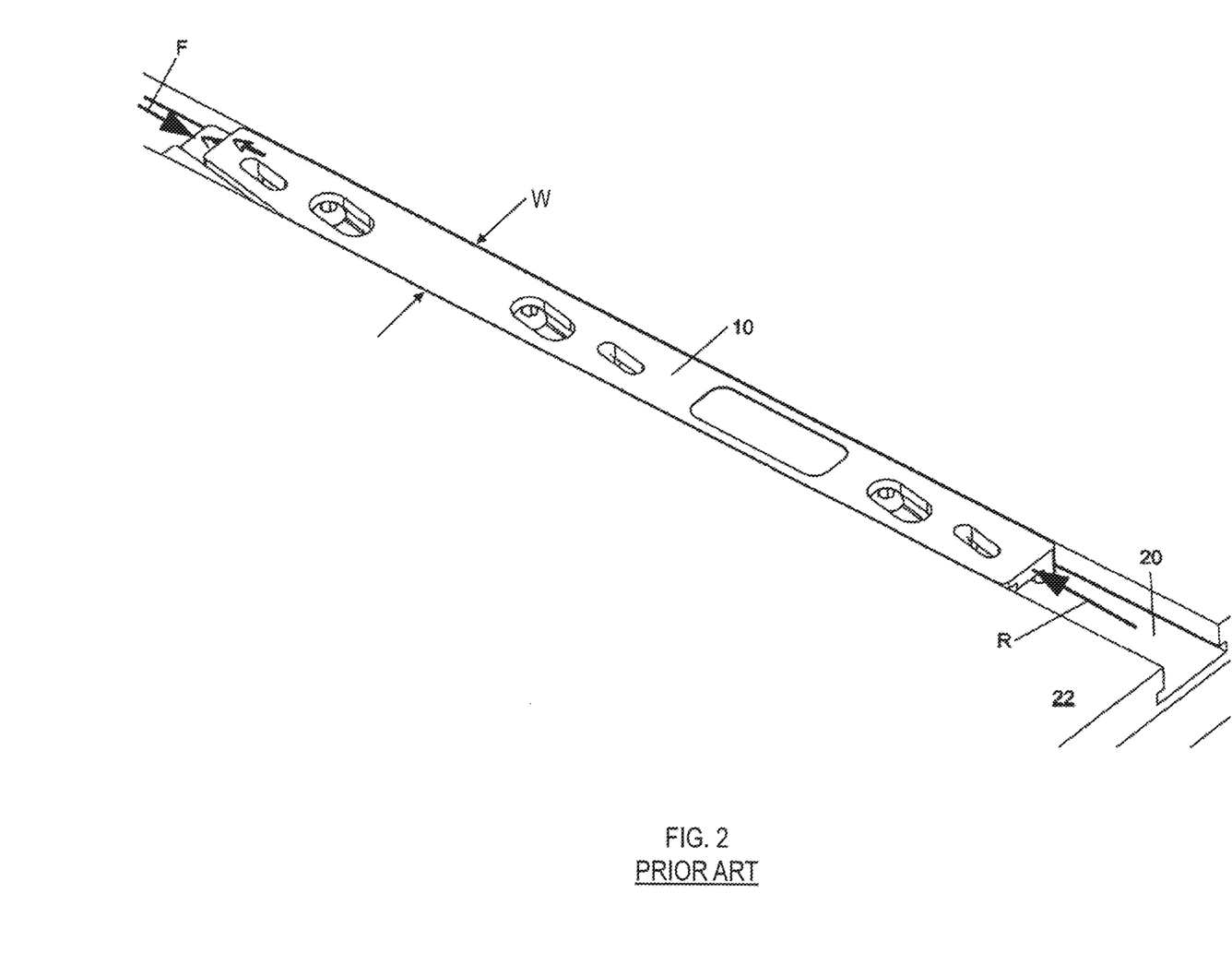
FIG. 2 shows the prior art miter bar assembly of FIG. 1 assembled and installed in a miter slot and being adjusted to match a width of the miter slot.
Figure 3:
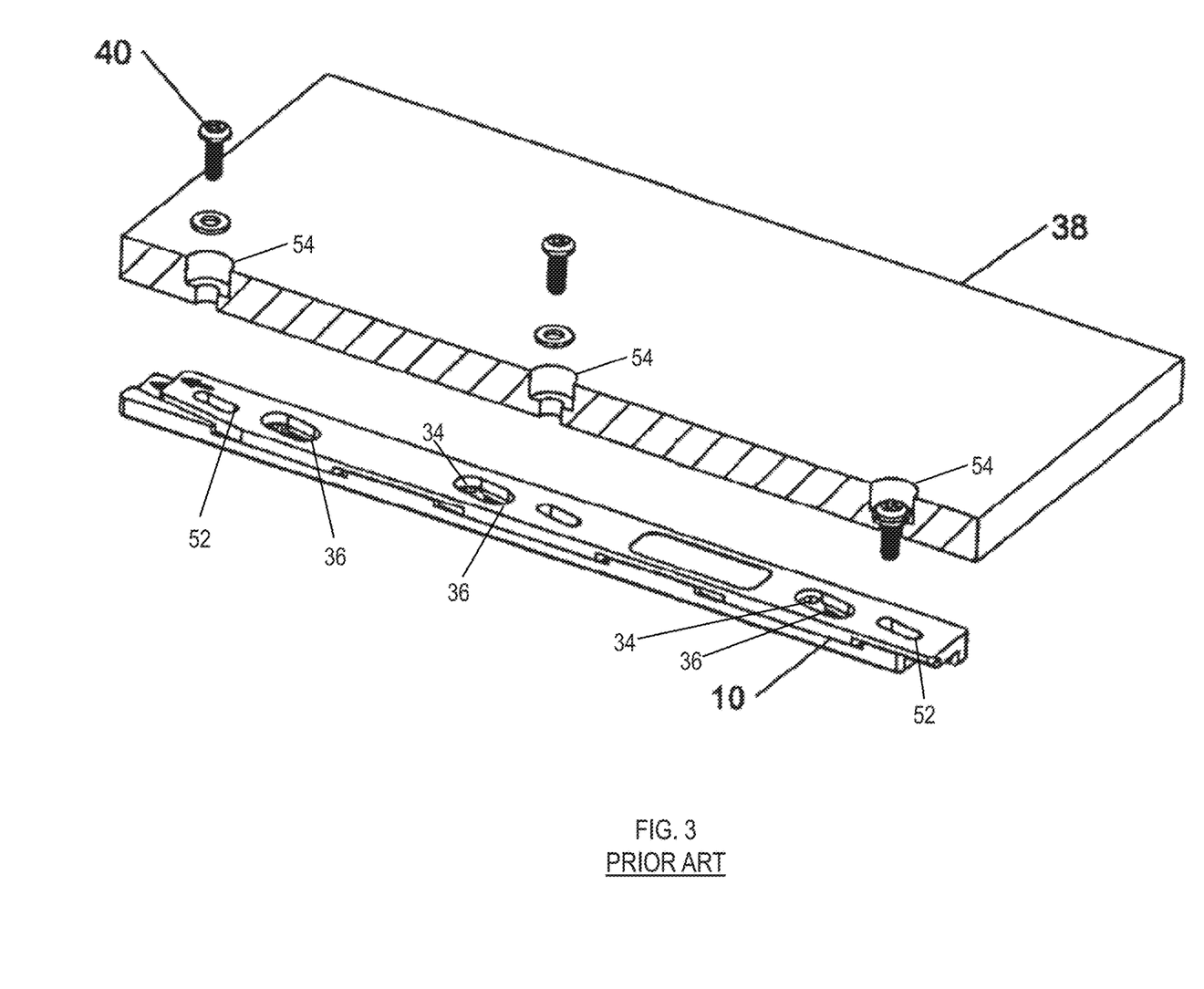
FIG. 3 shows the width-adjusted prior art miter bar assembly of FIG. 2 ready to be installed under a panel.
Figure 4:
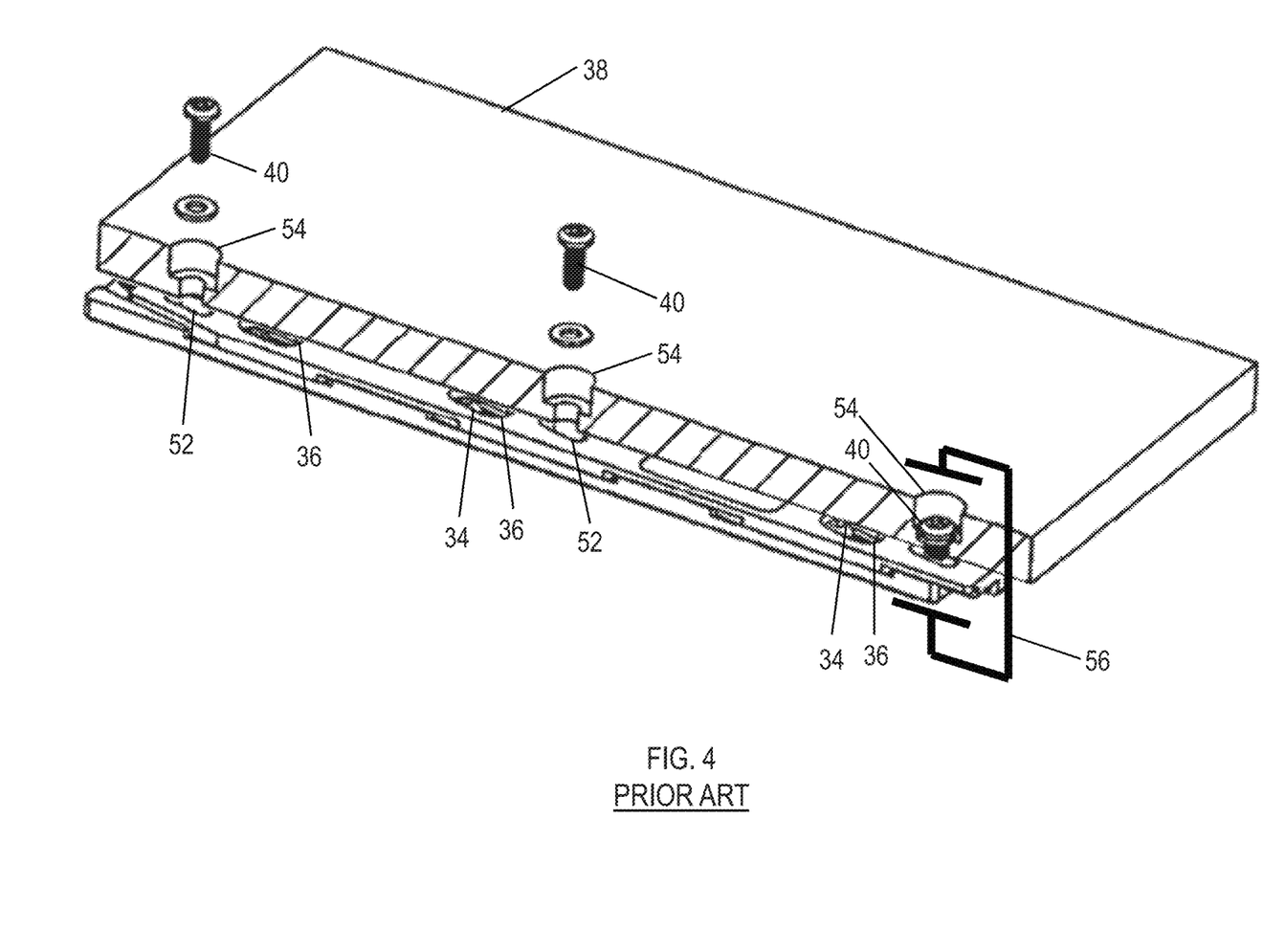
FIG. 4 shows the width adjusted prior art miter bar assembly of FIG. 2 partially installed under the panel.

After the top and bottom members 12, 14 are joined together, at least one and preferably a plurality of fasteners, such as width-adjustment screws 34 shown in FIGS. 2-4, are passed through respective slots 36 in the top member 12 and joined to the bottom member 14 such as by cooperating threaded inserts 44 with enough tightness to keep the assembly together but loose enough to allow for relative longitudinal sliding movement between the top and bottom members 12, 14. Each width-adjustment screw 34 includes a head 34a engaging the top member 12 and a shank 34b passing through the respective slot 36 in the top member 12 to engage the bottom member 14 for affixing the relative positions of the top and bottom members 12, 14. The bottom member 14 further includes threaded inserts 50 configured to receive attachment screws 40 used to secure the bottom member 14 to a panel 38 (see FIG. 3) via access holes 54 through the panel 38. The top member 12 includes a slot 52 that allows the attachment screw 40 to pass through the top member 12 to access the threaded insert 50 while accommodating relative movement of the top member 12.

FIG. 2 shows the miter bar assembly 10 in position within a miter slot 20 of a saw table 22. (The miter slot 20 shown is in the form of a T-slot.) The width of the miter bar assembly 10 is then increased to match that of the width of the miter slot 20 by sliding the top member 12 relative to the bottom member 14 so that the cooperating action of the contacting side surfaces 30, 32 increases the overall width of the miter bar assembly 10. This action causes the bottom member to come into full parallel contact with the left side wall of the slot and the top member to come into full parallel contact with the right side wall of the slot. Once the desired width of the miter bar assembly 10 is achieved, the width-adjustment screw 34 is then tightened to the bottom member to secure the desired width, thereby creating a width-adjusted miter bar assembly. The slots 36 receiving the width-adjustment screws 34 and the slots 52 receiving the attachment screws 40 each have a longitudinal axis disposed at the angle relative to the longitudinal axis of the miter bar assembly corresponding to the angle of the contacting side surfaces 30, 32.

As can be seen in FIG. 3 and FIG. 4, the width-adjusted miter bar assembly 10 is then fixed to the bottom of the panel 38 by installing the attachment screws 40 through the access holes 54, also through the slots 52, and into the threaded inserts 50. The slots 52 exist simply to permit the attachment screws 40 access to the bottom member 14.

As best seen in FIG. 4, when the width-adjusted miter bar assembly 10 is secured to the panel 38 by the attachment screws 40, the width-adjustment screws 34 are completely inaccessible because they are covered by the panel 38. Consequently, if the width of the width-adjusted miter bar assembly 10 needs to be adjusted again, the attachment screws 40 must be removed, the miter bar assembly 10 must be reinstalled in the miter slot 20, and the width adjustment process and the attachment process must be repeated. This may require several iterations until the width of the miter bar assembly 10 is exactly as needed.

Moreover, when the width-adjusted miter bar assembly 10 is secured to the panel 38 by the attachment screws 40, the attachment screws 40 act like a clamp 56 that clamps the top member 12 between the bottom member 14 and the panel 38. This fixes the top member 12, the bottom member 14, and the panel 38 into a rigid/non-adjustable assembly. As such, even if the width-adjustment screws 34 were accessible and could be loosened, the width of the miter bar assembly 10 could not be adjusted. The only possible way to adjust the width of the miter bar assembly 10 requires also loosening the attachment screws 40 because this would permit relative movement between the top member 12 and the bottom member 14. In most cases, width adjustment requires removing the miter bar assembly 10 from the panel 38 so the miter bar assembly 10 can be accessed and adjusted as shown in FIG. 2. Even if a user manages to access the miter bar assembly 10 to adjust the width while the miter bar assembly 10 is still loosely secured to the panel 38, simply loosening the attachment screws 40 permits movement of the miter bar assembly 10 relative to the panel 38. This can be undesirable when the position of the miter bar assembly 10 relative to the panel 38 is relied upon.

Figure 5:
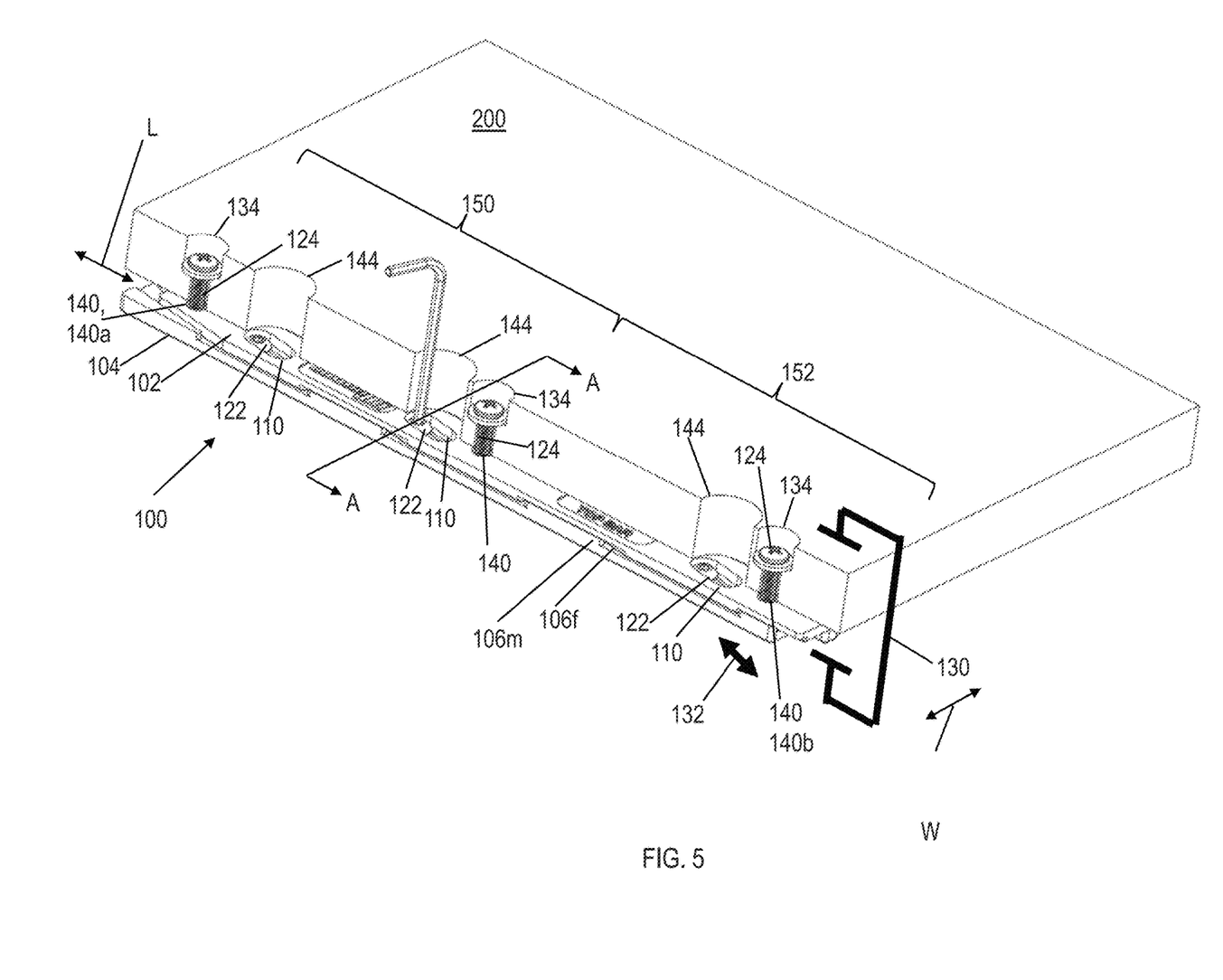
FIG. 5 shows an example embodiment of a miter bar assembly fixed to the bottom of an example embodiment of a panel.
Figure 6:
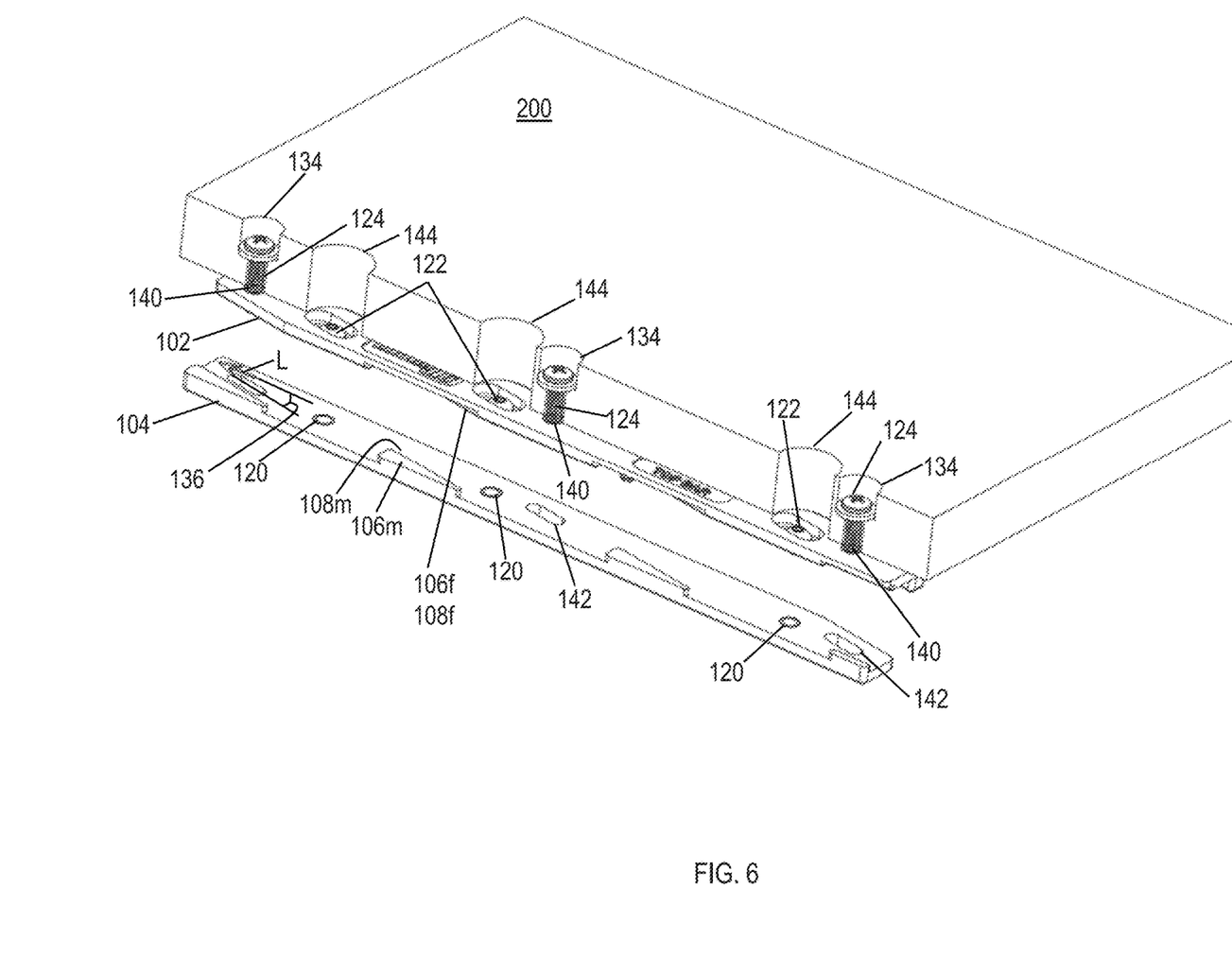
FIG. 6 shows the miter bar assembly with an example embodiment of a top member fixed to the bottom of an example embodiment of a panel and an example embodiment of the bottom member detached from the top member.
Figure 7:
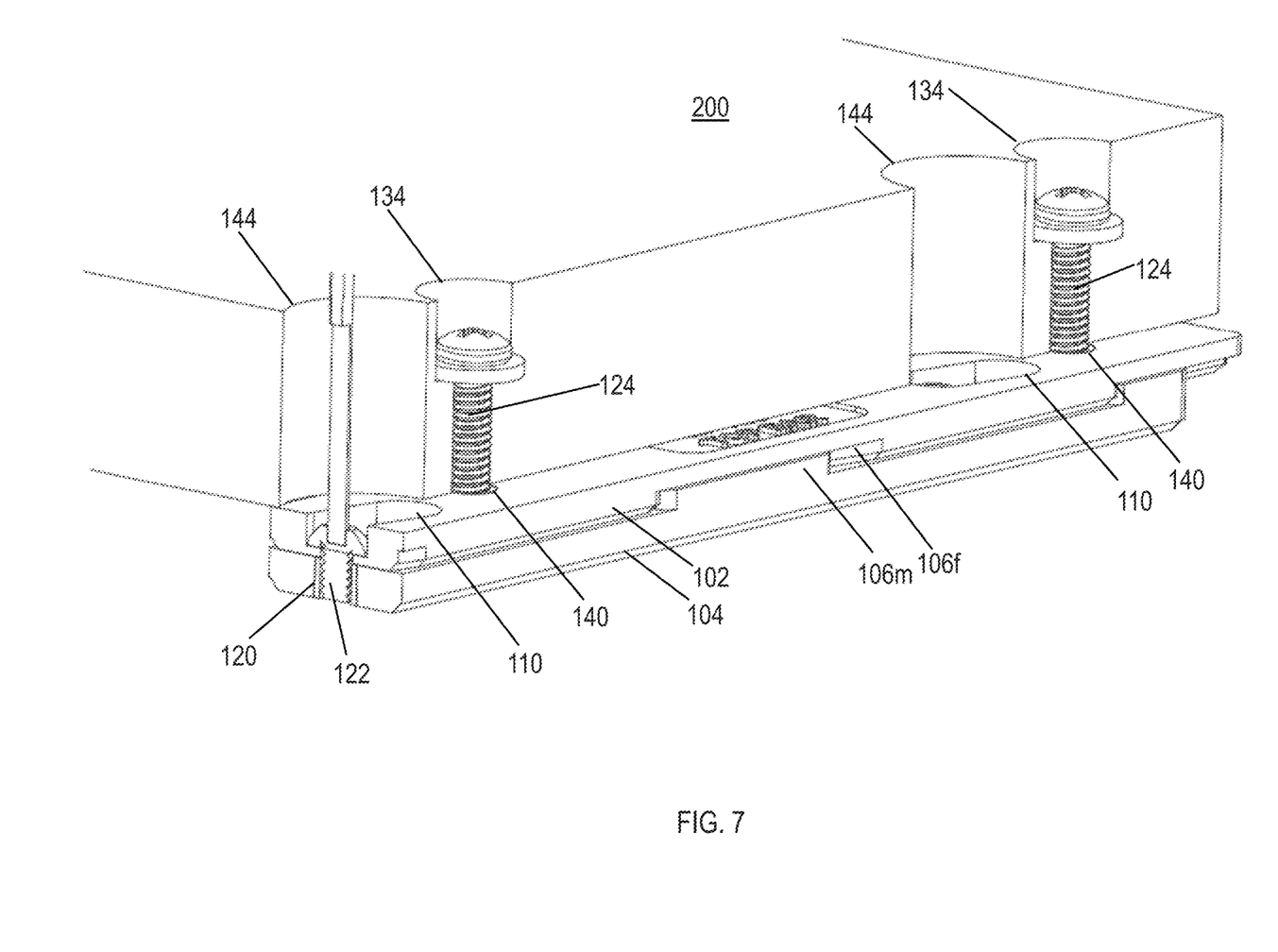
FIG. 7 is a sectional view of the miter bar assembly and panel taken at line A-A of FIG. 5.

FIG. 5 to FIG. 7 show an example embodiment of a miter bar assembly 100 disclosed herein. FIG. 5 shows the miter bar assembly 100 fixed to the bottom of an example embodiment of a panel 200, whereas FIG. 6 shows the bottom member detached, and FIG. 7 shows a section at line A-A of FIG. 5.

The miter bar assembly 100 is structurally and functionally similar to the miter bar assembly 10 of FIG. 1 to FIG. 4 in that it includes the top member 102, the bottom member 104, the wedge shapes 106*m*, 106*f* and contact surfaces 108*m*, 108*f*, top member openings 110 (e.g., oversized holes or the angled slots), bottom member fastener features 120 (e.g., female threads), and bottom member fasteners 122 (e.g. akin to the width-adjustment screws 34). In addition, the miter bar assembly 100 works in miter slots having a variety of shapes, including but not limited to T-shapes and U-shapes.

Unlike the embodiment of the miter bar assembly 10 of FIG. 1 to FIG. 4, in this example embodiment, the miter bar assembly 100 is configured specifically not to clamp the top member 102 between the bottom member 104 and the panel 200. Instead, the top member 102 itself is directly fixed to the panel 200 via the top member fasteners 124 and the bottom member 104 is, in turn, secured to the top member 102 via the bottom member fasteners 122. As a result, tightening the top member fasteners 124 does not clamp the top member 102, the bottom member 104, and the panel 200 together as a rigid/non-adjustable assembly. Instead, tightening the top member fasteners 124 only fixes the top member 102 to the panel 200 (akin to a different clamp 130). Because the bottom member 104 is secured only to the top member 102, the bottom member 104 is still free to move relative to the top member 102 along path 132.

When the top member openings 110 are slots, the orientation and length of the path 132 is determined by the orientation and length of the slots. In the example embodiment shown, the slot is oriented at an acute angle 136 to the longitudinal extent "L" of the miter bar assembly 100, so the path 132 is likewise disposed at an acute angle to the longitudinal extent "L" of the miter bar assembly 100. When the top member openings 110 are oversized holes, the bottom member 104 is free to move within the footprint defined by the oversized holes.

This arrangement is made possible first by installing the top member fasteners 124 through a panel top member fastener hole 134 and into top member fastener features 140 (e.g., female threads) disposed in the top member 102 (as opposed to being disposed in the bottom member 104). Relief slots 142 in the bottom member 104 are present merely to accommodate any portion of the top member fasteners 124 that may pass entirely though the top member fastener features 140 (e.g., a tip thereof) and thereby protrude into the bottom member 104.

Further, access is provided to the bottom member fasteners 122 through the panel 200 via panel bottom member fastener holes 144. When the miter bar assembly 100 is secured to under the panel 200 and in a miter slot, the width of the miter bar assembly 100 can be adjusted by loosening the bottom member fasteners 122 and moving the bottom member fastener 122 within the top member openings 110. Since the bottom member fastener 122 is secured to the bottom member 104, moving the bottom member fastener 122 moves the bottom member 104, which adjusts the width of the miter bar assembly 100.

The miter bar assembly 100 thereby need not be removed in order to adjust a width thereof. This reconfiguration is more than a simple relocation of elements. Instead, this relocation yields a substantial benefit that is not expected to accompany such a relocation. As such, this relocation represents a significant improvement.

In the example embodiment shown, where the top member openings 110 are angled slots, both the angled slot and the wedge shapes 106*m*, 106*f* collective guide the movement of the bottom member 104. However, when the top member openings 110 are angled slots, the wedge shapes 106*m*, 106*f* need not be present. Similarly, when the wedge shapes 106*m*, 106*f* are present, the top member openings 110 may simply be holes that are sufficiently oversized that they permit lateral adjustment while still retaining enough structure to enable the bottom member fasteners 122 to fix the bottom member 104 in place relative to the top member 102.

In the example embodiment shown, the panel top member fastener hole 134 span one or more top member openings 110. This necessitates the panel bottom member fastener holes 144 to permit access to the bottom member fasteners 122. In the example embodiment shown, the top member 102 includes a forward half and a rearward half. This is unlike any known prior art miter bar assemblies having a right angle guide, (e.g., U.S. Pat. No. 5,402,581), which may be pivotally mounted to the miter bar arm. In those prior art miter bar assemblies, any fasteners that permit adjustment of the width of the miter bar assembly are simple disposed remote from the right angle guide as opposed to being disposed under the right angle guide.

In the example embodiment shown, a first top member fastener feature 140a is disposed in the forward half 150 of the top member 102 and a second top member fastener feature 140b is disposed in the second half 152 of the top member 102. Here again, this is unlike any known prior art miter bar assemblies having a right angle guide because the right angle guides must be disposed at and limited to one end of the miter bar assembly to function as intended.

Figure 8:
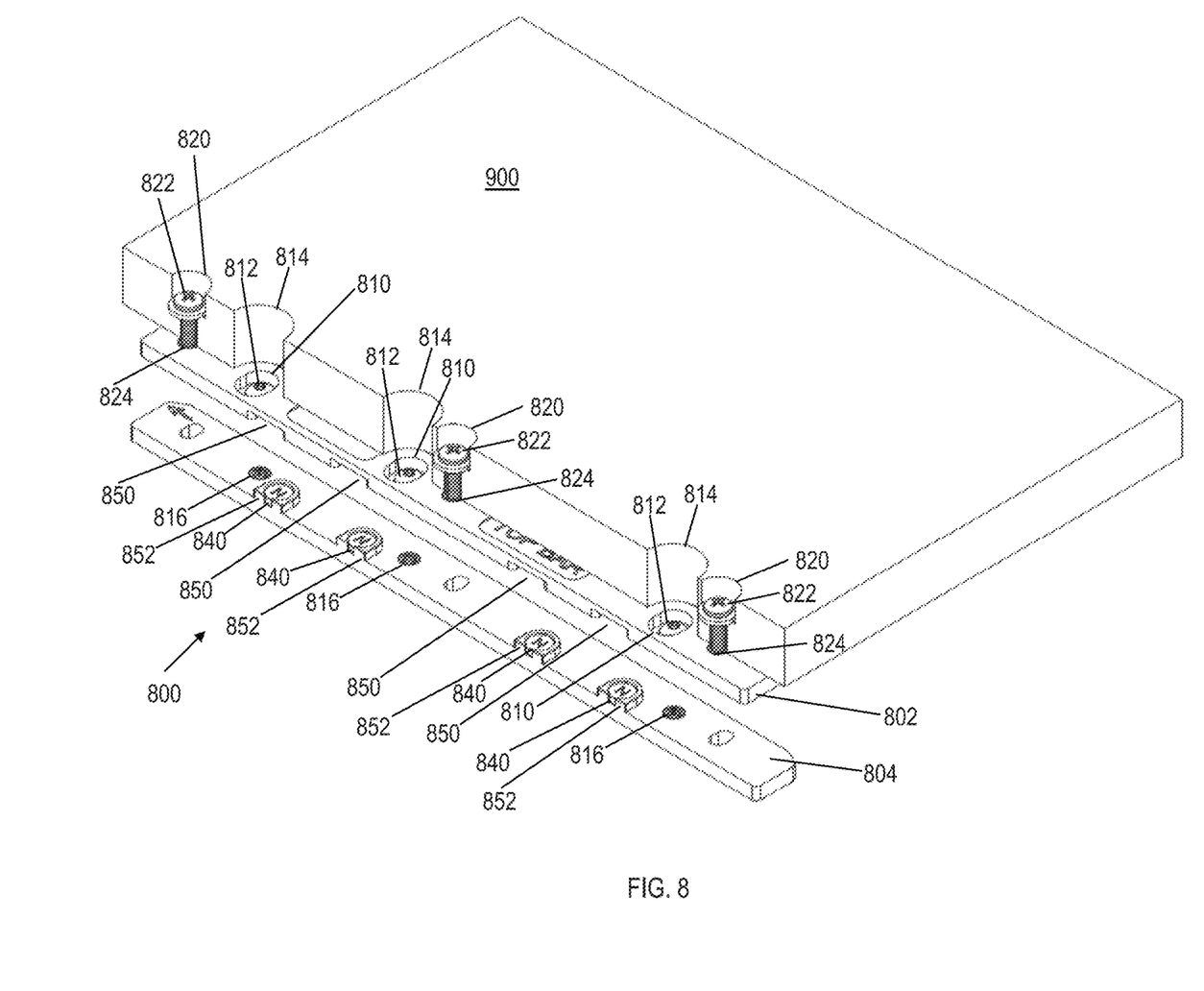
FIG. 8 shows another example embodiment of the miter bar assembly with another example embodiment of a top member fixed to the bottom of an example embodiment of a panel and another example embodiment of the bottom member detached from the top member.
Figure 9:
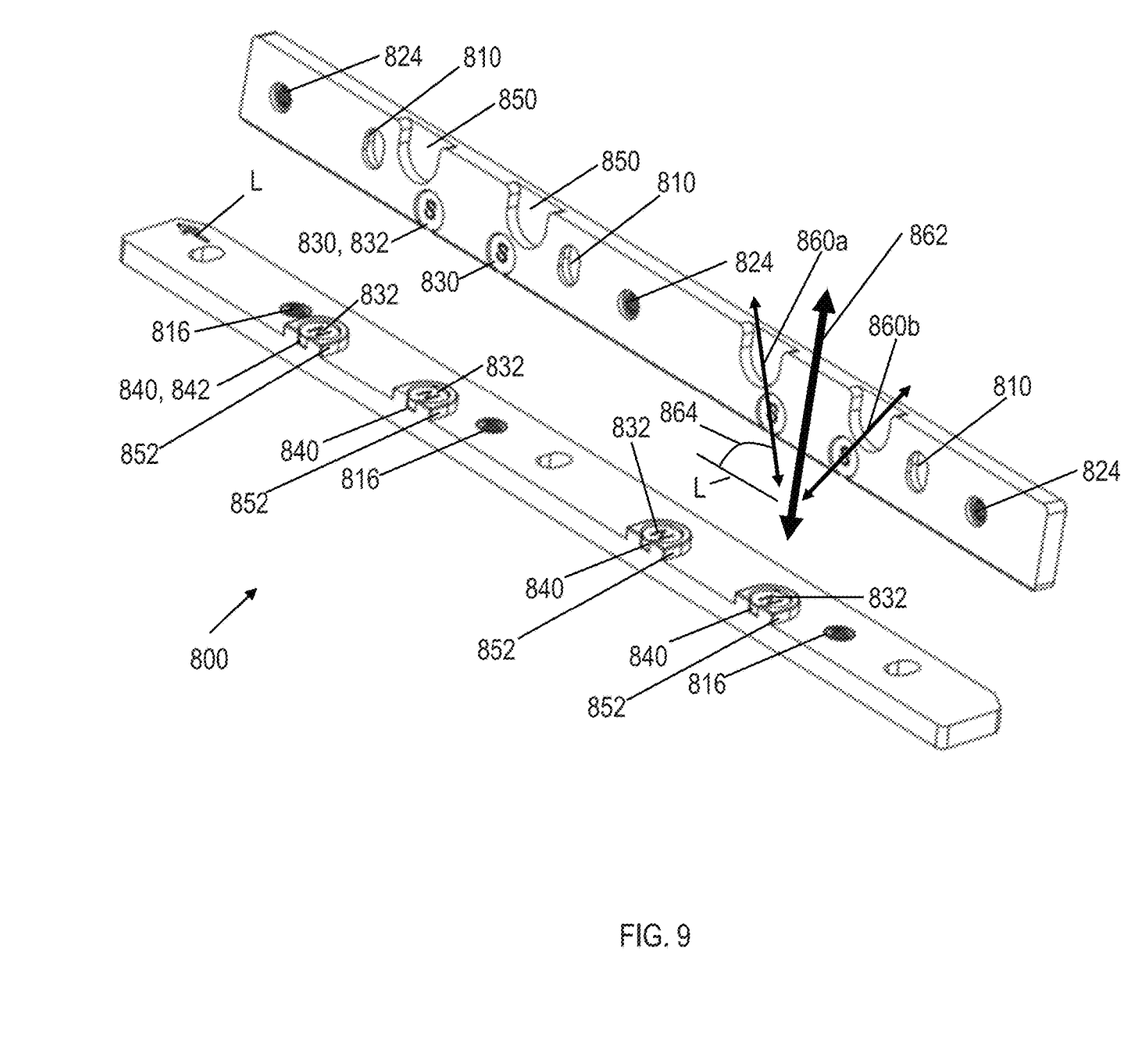
FIG. 9 shows the miter bar assembly of FIG. 8 in a disassembled state.
Figure 10:
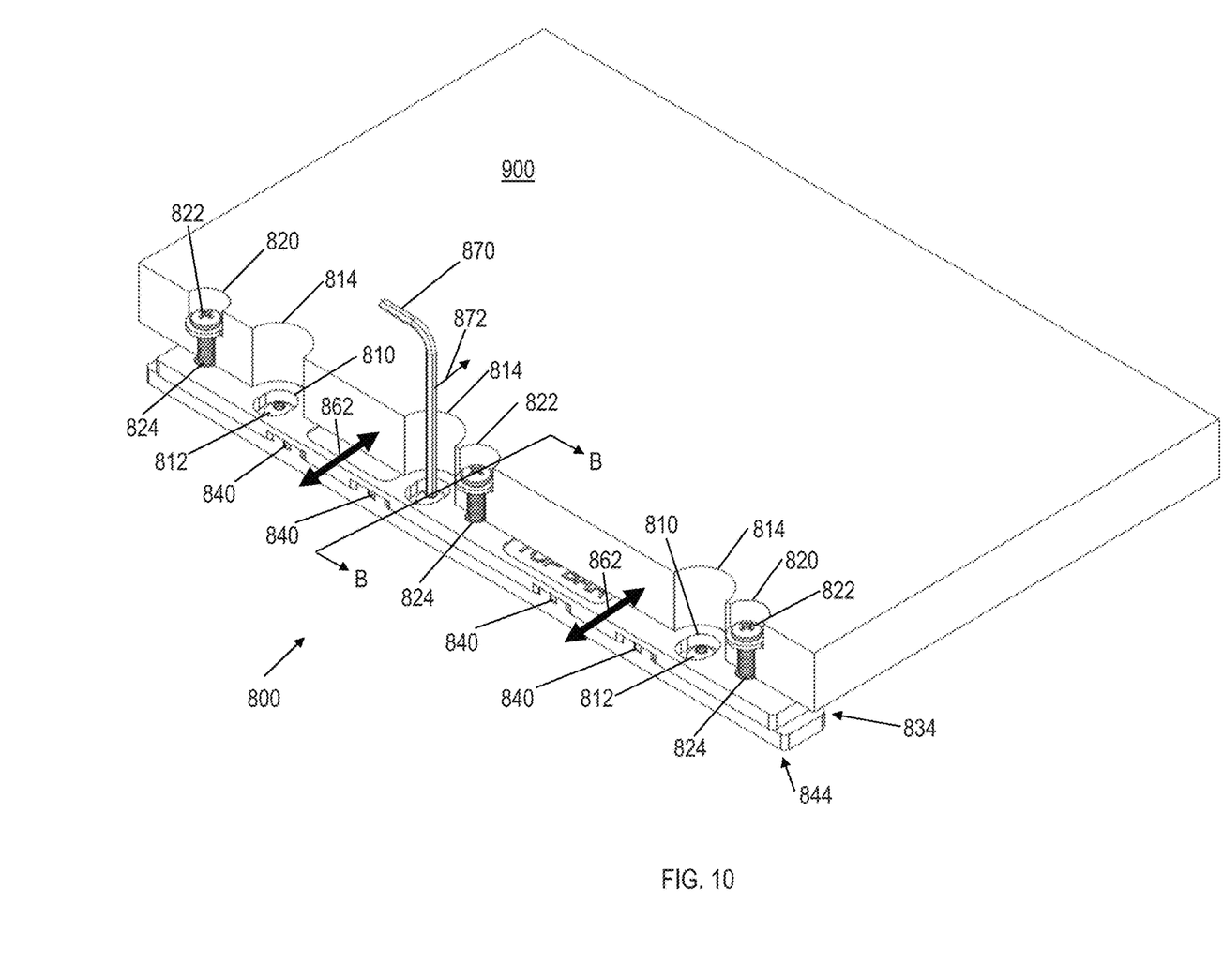
FIG. 10 shows the miter bar assembly of FIG. 8 assembled to the panel.
Figure 11:
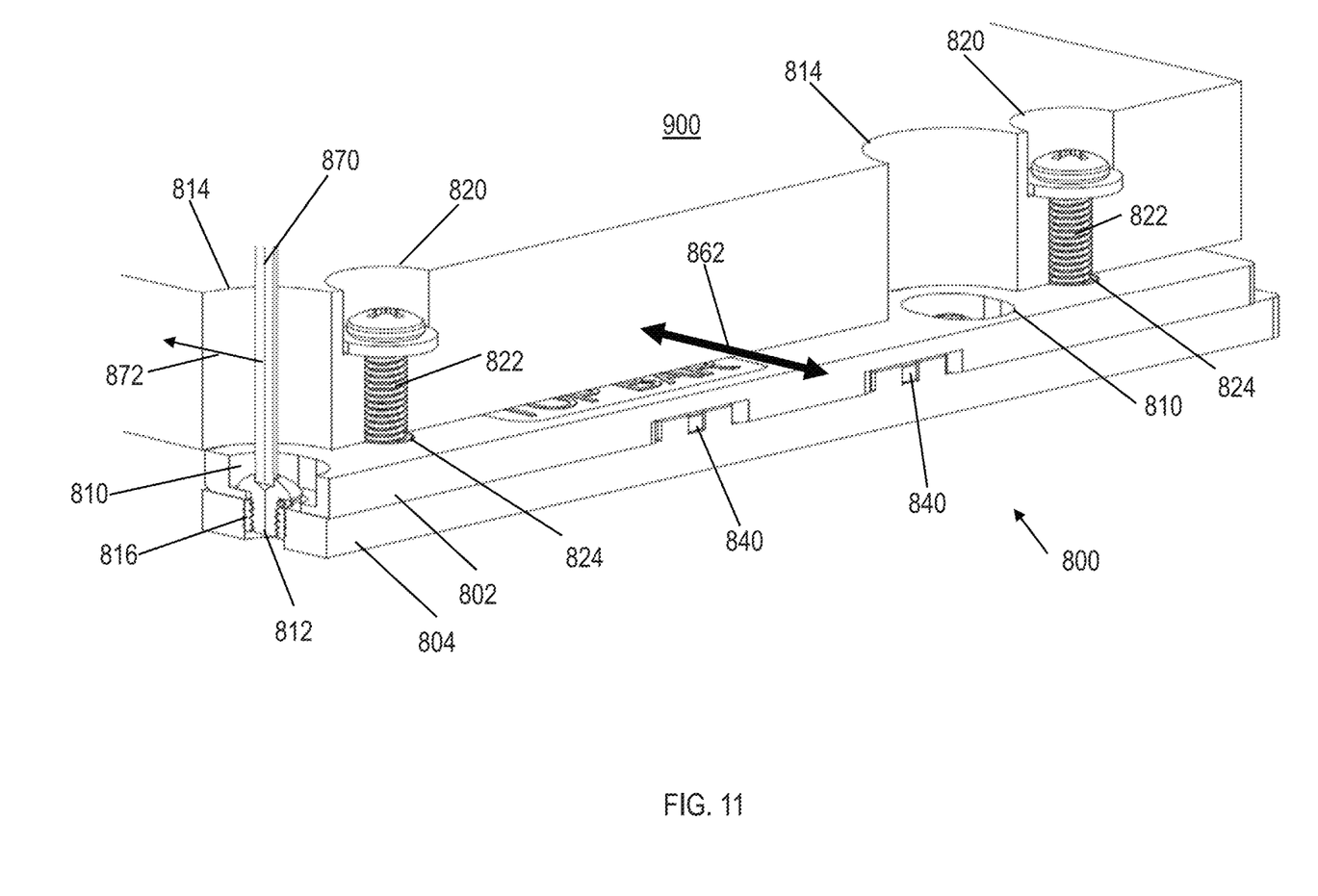
FIG. 11 is a sectional view of the miter bar assembly and panel taken at line B-B of FIG. 10.

FIG. 8 to FIG. 11 show an alternate example embodiment of a miter bar assembly 800 disclosed herein. FIG. 8 shows the top member 802 of the miter bar assembly 800 fixed to the bottom of an example embodiment of a panel 900, whereas FIG. 9 shows the miter bar assembly 800 disassembled, FIG. 10 shows the miter bar assembly 800 assembled and secured to the bottom of a panel 900, and FIG. 11 shows a section through line B-B of FIG. 10.

In this example embodiment of the miter bar assembly 800, magnets are used to urge the top member 802 to move laterally relative to the bottom member 804. This, in turn, automatically adjusts a width of the miter bar assembly 800 to a width of the miter slot.

The miter bar assembly 800 includes top member openings 810 and bottom member fasteners 812 accessible through the panel bottom member fastener holes 814. The top member openings 810 are configured to permit the bottom member fasteners 812 to move therewithin while the top member 802 and the bottom member 804 to move at least laterally (e.g., perpendicular to the longitudinal extent L of the miter bar assembly 800) relative to each other. The top member openings 810 are also configured to permit the bottom member fasteners 812 to selectively secure the bottom member 804 to the top member 802 via cooperation with the bottom member fastener features 816 (e.g., female threads). The top member opening 810 may be slots or oversized holes similar to those discussed above. Slots may be oriented perpendicular to the longitudinal extent L of the miter bar assembly 800. The panel 900 includes panel top member fastener holes 820. The top member fasteners 822 cooperate with top member fastener features 824 (e.g., female threads) to fix the top member 802 to the panel 900.

In this example embodiment, top member magnets 830 are disposed in optional top member magnet receptacles 832 in the top member 802 on a first lateral side 834 of the miter bar assembly 800. Bottom member magnets 840 are secured in optional bottom member magnet receptacles 842 on a second lateral side 844 of the miter bar assembly 800. As indicated by pole markers "N" and "S", the top member magnets 830 and the bottom member magnets 840 are oriented so that the magnetic fields repel each other and thereby create a magnetic force that urges the top member 802 laterally apart from the bottom member 804. A top member guide 850 (e.g., female) and a bottom member guide 852 (e.g., male) cooperate in a sliding relationship to ensure that the magnetic force is converted to relative lateral movement between the top member 802 and the bottom member 804.

In this example embodiment, where the top member openings 810 are slots that are oriented perpendicular to the longitudinal extent L of the miter bar assembly 800, and where the top member guide 850 and a bottom member guide 852 are present, both mechanisms ensure the magnetic force causes perpendicular lateral relative movement. However, such redundancy is not necessary. In some example embodiments, when a guiding slot is present the guide members need not be present and vice versa.

As can be seen in FIG. 9, when the top member 802 and the bottom member 804 are assembled, force vectors 860a, 860b are created between pairs of adjacent top member magnets 830 and bottom member magnets 840. Neither of the force vectors 860a, 860b is oriented perpendicular to the longitudinal extent L of the miter bar assembly 800, so the magnetic force created is guided into lateral movement by the slots and/or the top member guide 850 and a bottom member guide 852. In the example embodiment shown, the pairs of adjacent top member magnets 830 and bottom member magnets 840 are selectively positioned so that the longitudinal components of the force vectors 860a, 860b cancel each other out. This configuration ensures the resultant force vector 862 is thereby oriented perpendicular to the longitudinal extend L. Such a perpendicular force vector is advantageous when seeking lateral/perpendicular movement.

The miter bar assembly 800 is installed in a miter slot simply by laterally pushing the bottom member 804 toward the top member 802 to narrow the width of the miter bar assembly 800 enough so that the miter bar assembly 800 will fit within the miter slot. This can be accomplished while the top member 802 is secured to the panel 900 by inserting a tool 870 through the panel bottom member fastener holes 814 and using the tool 870 to laterally push on the bottom member fasteners 812 in direction 872. The bottom member fasteners 812 are secured to and, in turn, thereby laterally push the bottom member 804. The miter bar assembly 800 is then installed in the miter slot and the bottom member 804 is released. Releasing the bottom member 804 allows the bottom member 804 to move laterally away from the top member 802 by virtue of the magnetic force. The miter bar assembly 800 will naturally self-expand to fill the miter slot and thereby set its proper width. The bottom member fasteners 812 can then be tightened using the tool 872 and the miter bar assembly 800 and attached panel 900 can be used for woodworking.

The relative positions of the adjacent top member magnets 830 and bottom member magnets 840 and an angle 864 of the resulting force vector can vary. For example, a pair of adjacent top member magnets 830 and bottom member magnets 840 can be positioned so that the resulting force vector is perpendicular to the longitudinal extent L of the miter bar assembly 800. Such a configuration would work with the slots and/or the top member guide 850 and the bottom member guide 852 shown. The angle 864 may be obtuse as is shown. Alternately, the angle 864 may be acute and the angle 864 may even be zero. In the latter, angled slots like those shown in the example embodiment of FIG. 5 may be used to convert the magnetic force, which is aligned with the longitudinal extent L, into lateral movement. Alternately, or in addition, the top member guide and the bottom member guide may be angled to convert the longitudinal force into lateral movement. Angled slots and/ or the angled top member guide and the bottom member guide may, of course, be used for any angle 864 should a combination of longitudinal movement and lateral movement be desired.

In alternate example embodiments, there may be less interaction or no interaction between the top member magnets 830 and the bottom member magnets 840. Such example embodiments may be suitable for use in miter slots formed in worktables with magnetically responsive materials, such as ferritic materials et al. In such example embodiments, once the miter bar assembly is disposed in the miter slot, the top member magnets will be attracted to a first side of the miter slot and will thereby pull the top member toward the first side of the miter slot. The bottom member magnets will be attracted to a second, opposite side of the miter slot and will thereby pull the bottom member toward the second side of the miter slot. Hence, the magnets will urge the top member and the bottom member apart.

In the example embodiment shown in FIG. 5, the repulsive magnetic force will urge the top member 802 and the bottom member 804 apart regardless of the material composition of the worktable surrounding the miter slot. Should the example embodiment shown in FIG. 5 be installed in a miter slot formed in a magnetically responsive material, both the repulsive magnetic force between the magnets and an attraction of each magnet to a respective side of the miter slot will work together to urge the top member and the bottom member apart laterally.

The present inventors have thereby created an improved miter bar assembly that is inexpensive to implement and which provides a significantly improves the woodworking process. As such, it represents and improvement in the art.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus, comprising a miter bar assembly configured to slide in a miter bar slot that is recessed into a worksurface, comprising:
   a top member comprising: a top member opening configured to permit a bottom member fastener to pass through the top member; and a top member fastener feature configured to cooperate with a top member fastener to immovably fix the top member directly to a bottom side of a panel that is resting on the worksurface; and
   a bottom member positioned under the top member and comprising: a bottom member fastener feature configured to cooperate with the bottom member fastener and the top member opening to enable the bottom member to move laterally relative to the top member and to selectively immovably fix the bottom member to the top member;
   wherein at least one of: a magnetic force urges the bottom member and the top member laterally apart; and relative longitudinal movement between the bottom member and the top member adjusts a lateral position of the bottom member relative to the top member, and
   wherein the top member fastener feature comprises female threads configured to receive the top member fastener to secure the top member directly to the panel.

2. The apparatus of claim 1, further comprising a second top member fastener feature configured to cooperate with a second top member fastener to immovably fix the top member directly to the bottom side of the panel,
   wherein the top member opening is disposed between the top member fastener feature and the second top member fastener feature.

3. The apparatus of claim 2, further comprising:
   a second top member opening configured to permit a second bottom member fastener to pass through the top member; and
   a second bottom member fastener feature configured to cooperate with the second bottom member fastener and the second top member opening to enable the bottom member to move laterally relative to the top member and to selectively immovably fix the bottom member to the top member;
   wherein the top member opening and the second top member opening are disposed between the top member fastener feature and the second top member fastener feature.

4. The apparatus of claim 2, wherein the top member comprises a forward half and a rearward half, and wherein the top member fastener feature is disposed in the forward half and the second top member fastener feature is disposed in the second half.

5. The apparatus of claim 1,
   wherein the relative longitudinal movement between the bottom member and the top member adjusts the lateral position of the bottom member relative to the top member; and
   wherein the top member opening comprises a top member angled slot oriented at an acute angle to a longitudinal extent of the top member.

6. The apparatus of claim 5, further comprising the bottom member fastener secured to the bottom member fastener feature;
   wherein movement of the bottom member fastener in the top member angled slot moves the bottom member therewith at the acute angle relative to the top member.

7. The apparatus of claim 6, wherein the bottom member fastener feature comprises female threads configured to receive the bottom member fastener.

8. The apparatus of claim 6, further comprising:
   a top wedge member disposed on a bottom of the top member; and
   a bottom wedge member disposed on a top of the bottom member;
   wherein contacting surfaces of the top wedge member and the bottom wedge member are disposed at the acute angle and maintain contact with each other to guide the movement of the bottom member at the acute angle.

9. The apparatus of claim 1,
   wherein the magnetic force urges the bottom member and the top member laterally apart;
   wherein the top member comprises a top member magnet disposed adjacent a first lateral side of the miter bar assembly; and
   wherein the bottom member comprises a bottom member magnet disposed adjacent a second lateral side of the miter bar assembly opposite the first lateral side.

10. The apparatus of claim 9, wherein the top member magnet and the bottom member magnet are oriented to repel each other and thereby generate the magnetic force that urges the bottom member and the top member laterally apart.

11. An apparatus, comprising:
a panel configured to rest on a work surface; and
a miter bar assembly configured to slide in a miter bar slot that is recessed into the work surface and comprising:
a top member comprising a top member opening;
a top member fastener configured to immovably fix the top member directly to a bottom of the panel;
a top member fastener feature comprising female threads configured to receive the top member fastener;
a bottom member; and
a bottom member fastener directly accessible through a panel bottom member fastener hole disposed in the panel over the top member opening, wherein the bottom member fastener is configured to cooperate with the top member opening to enable the bottom member to move laterally relative to the top member and to selectively immovably fix the bottom member to the top member.

12. The apparatus of claim 11,
wherein the panel comprises a panel top member fastener hole; and
wherein the top member fastener passes through the panel top member fastener hole and into the female threads to fix the top member directly to the bottom of the panel.

13. The apparatus of claim 12,
wherein the miter bar assembly further comprises a second top member fastener configured to immovably fix the top member directly to the bottom of the panel;
wherein the panel comprises a second panel top member fastener hole;
wherein the second top member fastener passes through the second panel top member fastener hole to secure the top member directly to the bottom of the panel; and
wherein the top member opening is disposed between the panel top member fastener hole and the second panel top member fastener hole.

14. The apparatus of claim 11,
wherein relative longitudinal movement between the bottom member and the top member adjusts a lateral position of the bottom member relative to the top member; and
wherein the top member opening comprises a top member angled slot oriented at an acute angle to a longitudinal extent of the top member.

15. The apparatus of claim 14, further comprising:
a top wedge member disposed on a bottom of the top member; and
a bottom wedge member disposed on a top of the bottom member;
wherein contacting surfaces of the top wedge member and the bottom wedge member are disposed at the acute angle and maintain contact with each other to guide the relative longitudinal movement of the bottom member at the acute angle.

16. The apparatus of claim 11,
wherein a magnetic force urges the bottom member and the top member laterally apart;
wherein the top member comprises a top member magnet disposed adjacent a first lateral side of the miter bar assembly; and
wherein the bottom member comprises a bottom member magnet disposed adjacent a second lateral side of the miter bar assembly opposite the first lateral side.

17. The apparatus of claim 16, wherein the top member magnet and the bottom member magnet are oriented to repel each other and thereby generate the magnetic force that urges the bottom member and the top member laterally apart.

* * * * *